(No Model.)
G. WESTINGHOUSE, Jr., & A. SCHMID.
COMMUTATOR FOR DYNAMO ELECTRIC MACHINES.
No. 357,295. Patented Feb. 8, 1887.
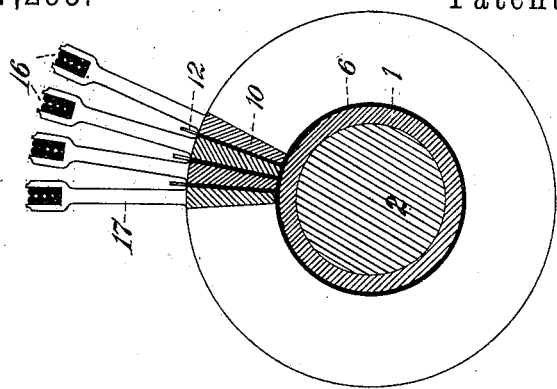
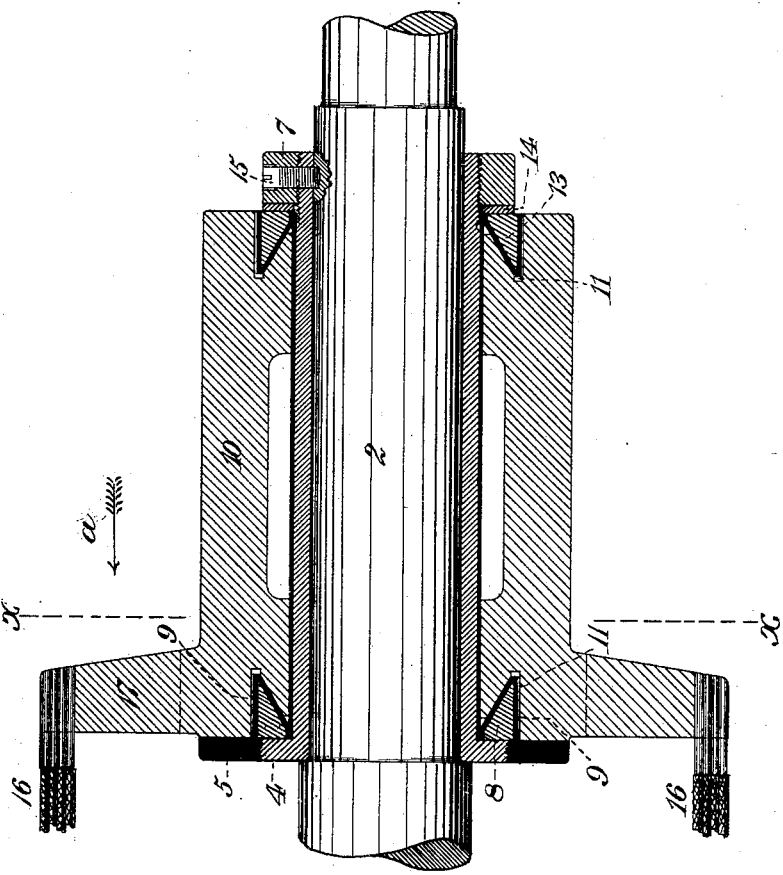
WITNESSES:
C. M. Clarke
R. H. Whittlesey
INVENTORS.
George Westinghouse Jr.
Albert Schmid
By Darwin S. Wolcott
Att'y.

UNITED STATES PATENT OFFICE.

GEORGE WESTINGHOUSE, JR., AND ALBERT SCHMID, OF PITTSBURG, PA.

COMMUTATOR FOR DYNAMO-ELECTRIC MACHINES.

SPECIFICATION forming part of Letters Patent No. 357,295, dated February 8, 1887.

Application filed July 31, 1886. Serial No. 209,646. (No model.)

*To all whom it may concern:*

Be it known that we, GEORGE WESTINGHOUSE, Jr., and ALBERT SCHMID, residing at Pittsburg, in the county of Allegheny and State of Pennsylvania, citizens of the United States, have invented or discovered certain new and useful Improvements in Commutators for Dynamo-Electric Machines, of which improvements the following is a specification.

In the accompanying drawings, which make part of this specification, Figure 1 is a sectional elevation of a commutator for dynamo-electric machines embodying our invention. Fig. 2 is a transverse section on the line $x$ $x$, Fig. 1, looking in the direction of the arrow $a$.

The invention herein relates to certain improvements in the manner of constructing and arranging the several parts forming the commutator for dynamo-electric machines.

Heretofore it has been customary to secure the segments or bars forming the commutator to the shaft of a dynamo-electric machine by means of an annular wedge, formed of fiber, fitting within correspondingly-shaped notches in the ends of the segments, said wedges forcing the inner walls of the notches against the shaft, or rather against a fiber on the shaft, and thereby securing the segments in place. As, however, there is always more or less moisture in the fiber forming the annular wedge and facing, which is generally quite thick, the segments soon become loose from the shrinking of the facing and wedge caused by the heating of the segments and the consequent expulsion of the moisture from the fiber; and, further, electrical connection is frequently made between the adjacent segments of the commutator and between the segments and the shaft of the dynamo by metallic dust formed by rubbing together of the commutator and the brushes.

The object of the invention herein is to so construct the clamping-ring or annular wedge that no appreciable change in dimensions will be caused by the heating of the segments or the adjacent parts, and also to prevent any undue change or shrinkage of the support of the segments around the shaft; and it is a further object of the invention herein to prevent the formation of any electrical connection between such parts, which the successful operation requires to be insulated from each other.

To these ends the invention consists in the construction and combination of parts, substantially as hereinafter described and claimed.

In carrying out our invention a brass or other suitable metallic sleeve, 1, is slipped onto the shaft 2 of a dynamo-electric machine, the inner end of said sleeve being provided with a flange, 4, having a threaded perimeter, on which is screwed a fiber ring, 5, the purpose of which will be hereinafter referred to. The sleeve is faced with a thin layer of mica, fiber, or other suitable insulating material, 6, and the outer end of said sleeve is threaded for the reception of the clamping-nut 7. A brass or other suitable metal ring, 8, having an inclined inner wall, as shown, and faced as to its outer perimeter and inclined inner wall with fiber, mica, or other suitable insulating material, 9, is slipped over the sleeve 1 against the flange 4, the ring or annular wedge being so arranged that the apex thereof will project toward the middle of the sleeve. The segments or bars 10, having wedge-shaped notches 11 formed in their inner and outer ends, are arranged around the insulated sleeve 1, the notches at the inner ends of the segments engaging the annular wedge 8, as shown in Fig. 1. After all the segments or bars 10 have been arranged around the sleeve, as above stated, sheets of mica, fiber, or other insulating material 12 being interposed between adjacent segments, an annular wedge, 13, similar in construction to the wedge 8 and faced with insulating material, is slipped over the sleeve, the apex of the wedge entering the correspondingly-shaped notches 11 in the outer ends of the segments. The nut 7 is then screwed into the sleeve, a washer, 14, being interposed between the nut and wedge 13, thereby forcing the wedge 13 into the notches in the outer ends of the segments, and also forcing the notches at the inner ends of the segments over the wedge 8, the inclined faces of the wedges causing the portions of the segments included between them and the sleeve to bear tightly against said sleeve. The sleeve is secured to the shaft 2 by a set-screw, 15, passing through a threaded opening in the nut 7 and a slot in the sleeve, said slot being of sufficient size to permit of a tightening up of the nut, if required.

The wires 16 from the armature are secured in notches in the upper ends of the arms 17, formed on the inner ends of the segments 10, as shown.

In order to prevent an electrical connection being formed between adjacent arms 17 by metallic dust formed by the rubbing together of the brushes and commutator, the insulating sheets interposed between the segments are made of sufficient width to project a considerable distance in the space between adjacent arms 17. Electrical connection is also formed by the metallic dust between the sleeve and the inner ends of the segments, and as this point is not readily accessible a ring of insulating material is screwed onto the inner end of the sleeve and extends a considerable distance up the inner ends of the segments.

It will be observed that in forming the major part of the annular clamping-wedges of metal no material changes in the dimensions thereof can be effected by the heating of commutator, and that therefore there is no liability of the segments becoming loose.

The term "fiber," as hereinbefore used, is a shop term for vulcanized fiber and other preparations thereof; but we do not wish to be understood as limiting ourselves to the use of vulcanized or other preparations of fiber, as other suitable insulating materials may be used in lieu thereof.

We claim herein as our invention—

In a commutator for dynamo-electric machines, the combination of the segments forming the commutator, said segments being provided with arms for connection with the wires of the armature, and insulating sheets arranged between the segments, said sheets projecting outwardly between the arms of the segments, substantially as set forth.

In testimony whereof we have hereunto set our hands.

GEO. WESTINGHOUSE, JR.
ALBERT SCHMID.

Witnesses:
DARWIN S. WOLCOTT,
R. H. WHITTLESEY.